United States Patent
Williams et al.

(10) Patent No.: US 11,174,400 B2
(45) Date of Patent: Nov. 16, 2021

(54) DIFFUSION CONTROLLED NANOCOMPOSITE-INKS

(71) Applicant: Vadient Optics, LLC, Beaverton, OR (US)

(72) Inventors: George Williams, Portland, OR (US); John Paul Harmon, Albany, OR (US); Charles G. Dupuy, Corvallis, OR (US); Ngoc Thanh Nguyen, Salem, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 0 days.

(21) Appl. No.: 14/863,297

(22) Filed: Sep. 23, 2015

(65) Prior Publication Data

US 2017/0080459 A1 Mar. 23, 2017

(51) Int. Cl.
*C09D 11/03* (2014.01)
*B41J 2/00* (2006.01)

(52) U.S. Cl.
CPC ............... *C09D 11/03* (2013.01); *B41J 2/00* (2013.01)

(58) Field of Classification Search
CPC ..................................................... C09D 11/03
See application file for complete search history.

(56) References Cited

U.S. PATENT DOCUMENTS

| 2015/0023643 | A1* | 1/2015 | Chartoff | C08K 3/30 385/124 |
| 2015/0346580 | A1* | 12/2015 | Williams | G02F 1/3526 359/326 |

FOREIGN PATENT DOCUMENTS

WO WO 2014/179746 * 11/2014

* cited by examiner

*Primary Examiner* — Elizabeth A Burkhart
(74) *Attorney, Agent, or Firm* — Alleman Hall Creasman & Tuttle LLP (57) ABSTRACT

A method of manufacturing a nanocomposite GRIN optical-element. The method comprises providing a volumetric gradient refractive profile and providing a plurality of nanocomposite-inks to form the GRIN optical-element. Each of the plurality of nanocomposite-inks have nanoparticles dispersed in an organic-matrix. The plurality of nanocomposite-inks comprising of a nanoparticle diffusion inhibiting nanocomposite-ink wherein nanoparticle diffusion is inhibited with respect to another of the plurality of nanocomposite-inks. The diffusion inhibiting nanocomposite-ink having a different dielectric property from at least one of the other plurality of nanocomposite-inks. The plurality of nanocomposite-inks also comprising a nanoparticle diffusion permitting nanocomposite-ink wherein nanoparticle diffusion is permitted with respect to at least another of the plurality of nanocomposite-inks.

28 Claims, 7 Drawing Sheets

DIFFUSION CONTROLLED NANOCOMPOSITE-INKS

TECHNICAL FIELD OF THE DISCLOSURE

The present disclosure relates in general to drop-on-demand inkjet printing. This application relates in particular to methods of precise and efficient control of diffusion to create high fidelity gradient nanocomposites.

DISCUSSION OF BACKGROUND ART

A class of freeform gradient index materials rely on axial, radial, other two-dimensional varying, or three-dimensionally varying concentrations of one or more organic or inorganic materials, such as nanoparticles, which result in nonhomogeneous complex dielectric properties throughout the material. For example, the optical index can be varied throughout a gradient index (GRIN) optical device so that light can refract not only at the air-optic interface, but also refract as the light passes through the nonhomogeneous 3D gradient index optical material.

Inkjet printing technology allows manufacture of such GRIN optics by depositing at least two "inks" with various concentrations of one of more organic or inorganic material components. For a GRIN lens, a low-index material and high index material are used. To create the low-index inks, monomers unloaded or containing a very small concentrations of materials are used. To create a high-index material, the percent volume concentrations of high index organic or inorganic fillers is increased. One or more of these materials are deposited in proper filler concentrations to create the desired gradients for one or more the complex dielectric properties.

This disclosure relates to another approach.

SUMMARY OF THE DISCLOSURE

The present disclosure is directed to inkjet printed nanocomposite structures, including 3D and 3D freeform gradient index optics and dispersion corrected optical-elements. In one aspect the method of manufacturing a nanocomposite GRIN optical-element comprises providing a volumetric gradient refractive profile and providing a plurality of nanocomposite-inks to form the GRIN optical-element. Each of the plurality of nanocomposite-inks have nanoparticles dispersed in an organic-matrix. The plurality of nanocomposite-inks comprise a nanoparticle diffusion inhibiting nanocomposite-ink wherein nanoparticle diffusion is inhibited with respect to another of the plurality of nanocomposite-inks. The plurality of nanocomposite-inks also comprise a nanoparticle diffusion nanocomposite-ink wherein nanoparticle diffusion is permitted with respect to at least another of the plurality of nanocomposite-inks. The plurality of nanocomposite-inks are deposited and cured to form the volumetric gradient refractive profile.

In another aspect of the present disclosure the plurality of nanocomposite-inks consist only of diffusion inhibiting nanocomposite-inks. Mixing between the diffusion inhibited nanocomposite-inks is forced by advection mechanisms, for instance through droplet deposition.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description of preferred methods and embodiment given below, serve to explain principles of the present disclosure.

DETAILED DESCRIPTION

Referring now to the drawings, wherein like components are designated by like reference numerals. Methods of manufacture and various embodiments of the present disclosure are described further hereinbelow.

A GRIN optical-element has volumetric internally changing refractive-indices in one, two, or three axis. In order to manufacture a GRIN optical element, a range of refractive indices must be produced to manufacture high-fidelity optics in respect to the intended design. In inkjet printing GRIN optical-elements, practical and economic realities limit the available materials. At minimum the materials must have refractive-index values that extend to, or overlap, the extremes required by the GRIN optical-element design. When using a nanocomposite-ink comprising a nanoparticle dispensed with an organic matrix intermediate refractive-indices values within the GRIN optical-element can be obtained by mixing the materials via diffusion, advection, drop mixing, surface wetting, and combinations thereof. The control over the diffusion, advection, and combination thereof determine the degree of fidelity of the optical-element as to the intended design. Provided herein is a method of manufacturing high-fidelity GRIN optical-elements.

Figure 1:
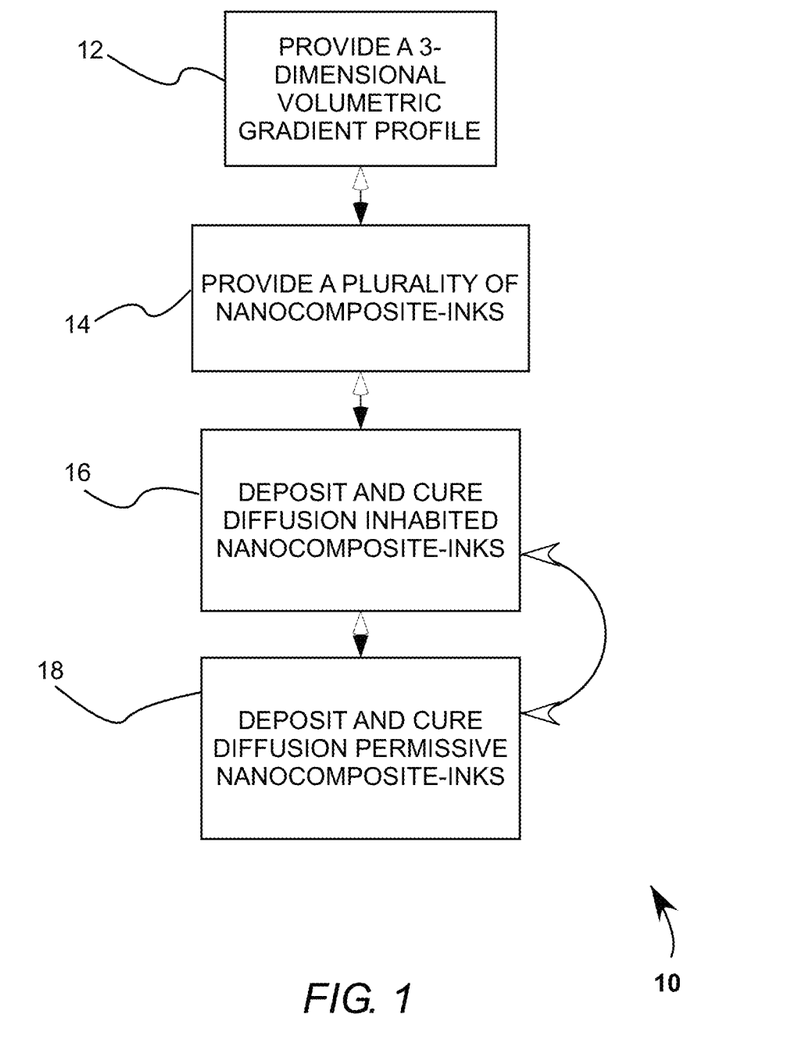
FIG. 1 is a flow diagram that illustrates a method for of manufacturing a nanocomposite GRIN optical-element, the method comprising providing a volumetric gradient refractive profile, providing a plurality of nanocomposite-inks, each of the nanocomposite-inks having nanoparticles dispersed in an organic-matrix, the plurality of nanocomposite-inks comprising at nanoparticle diffusion inhibiting nanocomposite-inks and a nanoparticle diffusion permitting nanocomposite-inks, depositing and curing droplets of the diffusion inhibited nanocomposite-inks to form the volumetric gradient refractive profile.

Referring to FIG. 1, a method 10 for manufacturing a GRIN optical-element comprises the following steps: A first step 12 includes providing a volumetric gradient refractive profile. The volumetric gradient refractive profile provides the refractive-index value at any particular voxel, or 3-dimensional spatial coordinate, within the optical-element. A second step 14 includes providing a plurality of nanocomposite-inks, each of the nanocomposite-inks having nanoparticles dispersed in an organic-matrix, with nanoparticle inhibiting properties between at least two of the nanocomposite inks, herein referred to as diffusion inhibiting nanocomposite-inks, and having nanoparticle diffusion permitting properties between at least two of the plurality of nanocomposite-inks, herein referred to as diffusion permissive nanocomposite-inks. The diffusion inhibited nanocomposite-inks are formulated with equalized diffusion forces preventing, or at least substantially slowing, nanoparticle diffusion between the nanoparticle diffusion inhibiting nanocomposite-ink droplets. The diffusion permissive nanocomposite-inks have unequal diffusion forces and have a higher diffusion rate of nanoparticles. A third step 16 includes depositing and curing droplets of the diffusion inhibited nanocomposite-inks in areas that require limited, or low, nanoparticle diffusion and depositing and curing droplets of the diffusion permissive nanocomposite-inks in areas that require greater diffusion of nanoparticles.

In one implementation the diffusion inhibiting nanocomposite-inks are deposited volumetrically in that require high frequency gradient profiles. In other implementations the diffusion inhibiting nanocomposite-inks are deposited in order to optimize deposition speed and delay curing. In yet another implementation the diffusion inhibiting nanocomposite-inks are deposited in order to have about uniform nanoparticle concentrations.

Another method of the present invention includes providing a gradient refractive profile, providing a plurality of the diffusion inhibited nanocomposite-inks, at least two of the diffusion inhibited nanocomposite-inks having at least one different optical property and depositing and curing droplets of the diffusion inhibited nanocomposite-inks to form the volumetric gradient refractive profile. Here the gradient refractive profile is formed by advective mixing.

The plurality of nanocomposite-inks comprising the nanoparticles dispersed within the organic matrix can be comprised of a variety of materials. The organic-matrix of the nanocomposite-ink is an inkjet printable curable resin, optically clear in part for at wavelengths of the optical-elements intended use. Within the present disclosure, nanocomposite-inks can also include the organic-matrix without nanoparticles, also referred to as neat organic-matrix. The organic matrix can be cured by photo exposure, thermal processes chemical process, and combinations thereof. Non-limiting examples of organic-matrix materials include polyacrylate, hexanediol diacrylate (HDODA), polymethyl methacrylate (PMMA), diethylene glycol diacrylate (DEGDA), neopentyl glycol diacrylate (NPGDA), tricydodecane dimethanol diacrylate (TCDDMDA), bisphenol A novolcepoxy dissolved in organic solvent (SU-8), and other such materials. The nanoparticles dispersed within the organic-matrix can be any material or nanostructure that is sufficiently small, for those wavelengths of the optical-element's intended for use, not to scatter light. The nanoparticles can comprise one or more metal, dielectric, semiconductor, or organic materials. Non-limiting examples of nanoparticles include beryllium oxide (BeO), aluminum nitride (AlO), silicon carbide (SiC), zinc oxide (ZnO), silicon dioxide ($SiO^2$), hollow silicon dioxide nanospheres (hollow $SiO^2$) zinc sulfide (ZnS), zirconium oxide (ZrO), yttrium orthovanadate (YVO4), titanium oxide ($TiO_2$), copper sulfide ($CuS_2$), cadmium selenide (CdSe), lead sulfide (PbS), Tellurium oxide ($TeO_2$), Magnesium Oxide (MgO), Aluminum nitride (AlN), $LaF_3$, GaSbO, nano-Diamond, $ThF_4$, $HfO_2$-$Y_2O_3$, $Yb_2O_3$, $Dy_2O_3$, $ZrO_2$—$Y_2O_3$, $Si_3N_4$, $Y_2O_3$, KBr, $Ta_2O_5$, $HfO_2$, AlGaP, SiGe, GaAs, Au, LiF, molybdenum disulfide ($MoS_2$) and silicon dioxide ($SiO_2$), including those with core, core-shell, core-shell-ligand, and hollow architectures.

The nanocomposite-inks can be formulated by the nanoparticles type or type, the organic-matrix, organic-matrix type, concentration of nanoparticles, and combinations thereof. The refractive-index of the nanocomposite-inks is influenced by the formulation. An approximation can be calculated based on the summation by percent volume of the optical properties of the organic-matrix and the nanoparticles, although direct measurement is a preferred method of determining the refractive index for any given nanocomposite-ink formation. For a nanocomposite-ink with one nanoparticle type, the refractive index is given by the following equation:

$$n_{\text{eff}}(\lambda) = V\%_{NP} \times n_{NP}(\lambda) + V\%_{OM} \times n_{OM}(\lambda),$$

where $n_{\text{eff}}(\lambda)$ is the effective index of the nanocomposite-ink, $V\%_{NP}$ is the percent volume of the nanoparticles $n_{NP}(\lambda)$ is the refractive-index of the nanoparticles, $V\%_{OM}$ is the percent volume of the organic-matrix, and $n_{OM}(\lambda)$ is the refractive-index of the organic-matrix. Additional nanoparticles can be added and percent volume and refractive-index included in the equation.

In general, the nanocomposite-inks loaded with the nanoparticles will have a volume proportional increase of refractive-index. For instance, a nanocomposite-ink with nanoparticles that have a high-index relative to the organic-matrix will have increased refractive-index with increased nanoparticle concentration. Likewise, a nanocomposite-ink with a low-index nanoparticle, for instance a hollow buckety-ball, comprised mostly of air, with an optical refractive index (n) of n=1, results in a nanocomposite-ink with a refractive index lower than the organic-matrix.

The material type, size, and concentration of the nanoparticles at any particular area in the optical-element determines, at least in part, the refractive-index. As the nanoparticles concentration effects the index of refraction, the diffusion effects must be understood, accommodated, and controlled in order to print high fidelity GRIN optics that conform to the 3-dimensional refractive gradient profiles.

Diffusion is the flow of the nanoparticles to other areas in the optical-element. Diffusion forces determine the direction of the nanoparticle diffusion flow and flow rate. For instance, if two similar nanocomposite-inks are adjacent, one with a higher concentration of nanoparticles, then the nanoparticles flow from the high nanoparticle concentration areas to low nanoparticle concentration areas. The tendency for nanoparticles to move from high to low concentration areas is called drift current. The drift current or rate of nanoparticle diffusion is a highly complex process that depends on a number of factors, nonlimiting examples of which include the nanoparticle concentration, nanoparticle material types, nanoparticle shape, nanoparticle size distribution, nanoparticle surface affinity to the organic-matrix, whether the nanoparticle is bonded to the organic-matrix, the organic-matrix material and viscosity, droplet size, contact surface area between droplets, temperature of the droplets, and so on.

During printing diffusion occurs at every instance in which droplets of the nanocomposite-ink are deposited in contact with another of the nanocomposite-ink. The amount of diffusion depends on diffusion forces between the materials and the amount of time the nanocomposite-inks are allowed to diffuse. Within the present disclosure, nanoparticle diffusion is termed permissive when high diffusion forces are present between the nanocomposite-inks, given practical time limitations from deposition to curing. Nanoparticle diffusion is termed inhibited when low diffusion forces are present between nanocomposite-inks, given the same practical time limitation from deposition to curing.

In a typical printing process, a printhead will either raster, or move in some other scheduled pattern, depositing the nanocomposite-ink in droplets to form a least a first layer. Droplets that are deposited earlier in the printing process, before curing process, have more time to diffuse. Given enough time, diffusion of the nanoparticles will result in a homogenous material. The diffusion of nanoparticles can be slowed, or halted completely, by curing the organic-matrix. Partially curing the nanocomposite-ink slows diffusion, and fully curing effectively stops diffusion. Another method of the present disclosure is controlling diffusion through creating friction forces by manipulating one or more of the organic-matrix to inhibit drift of the nanoparticles. Yet, another way to inhibit diffusion is to design the organic-matrix to interact with surface wetting chemistries to engineer diffusive forces.

To control diffusion the aforementioned diffusion inhibiting nanocomposite-ink is formulated to minimize diffusive forces with respect to at least one of the other plurality nanocomposite-inks used to manufacture the optical-element. The diffusion permitting nanocomposite-ink is formulated to allow diffusion with respect to at least one of the other plurality of nanocomposite-inks. The diffusion inhibiting and diffusion permitting nanocomposite-inks can be formulated by adjusting any of the aforementioned properties that influence diffusion, practical examples include the nanoparticle concentration, nanoparticle material types, nanoparticles size, nanoparticle shape, pH value of the nanocomposite-ink, viscosity of the nanocomposite-ink, temperature of the nanocomposite-ink, and surface functionalization of the nanoparticles. For instance a diffusion inhibiting nanocomposite-ink can be formulated by having a nanoparticle concentration that about match another of the plurality of nanocomposite-inks, wherein the nanoparticles are a different type to cause the nanocomposite-inks to have different optical properties.

Figure 2A:
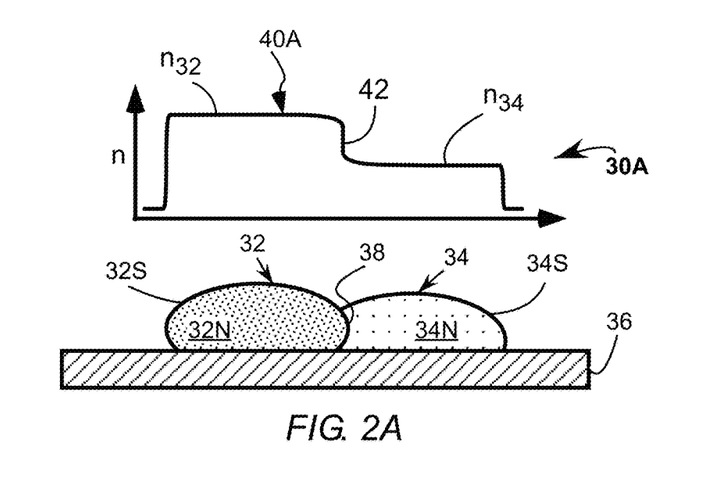
FIG. 2A is a cross-section view of the diffusion permitting nanocomposite-ink droplet adjacent to another droplet of the plurality of nanocomposite-inks.
Figure 2B:
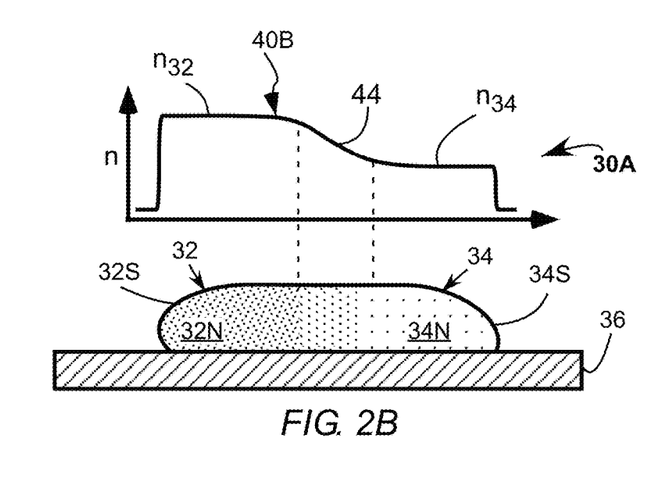
FIG. 2B is a cross-section view of that shown in FIG. 2A, wherein the droplets have coalesced.
Figure 2C:
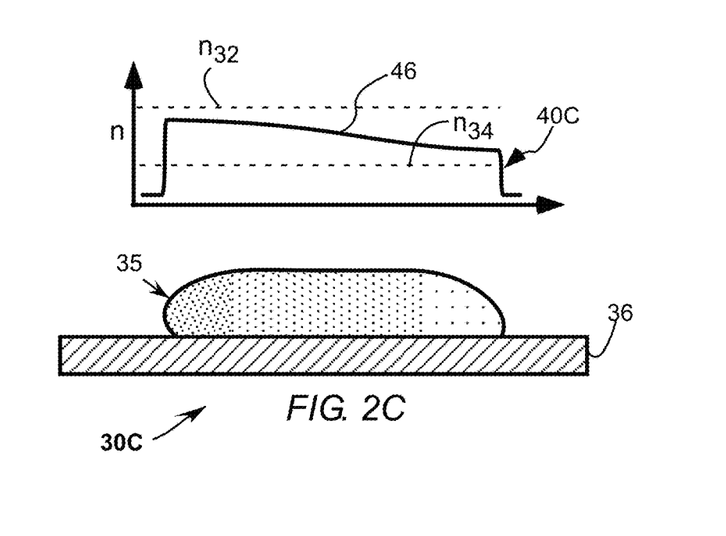
FIG. 2C is a cross-section view of that shown in FIG. 2B, wherein with increased nanoparticle diffusion.
Figure 2D:
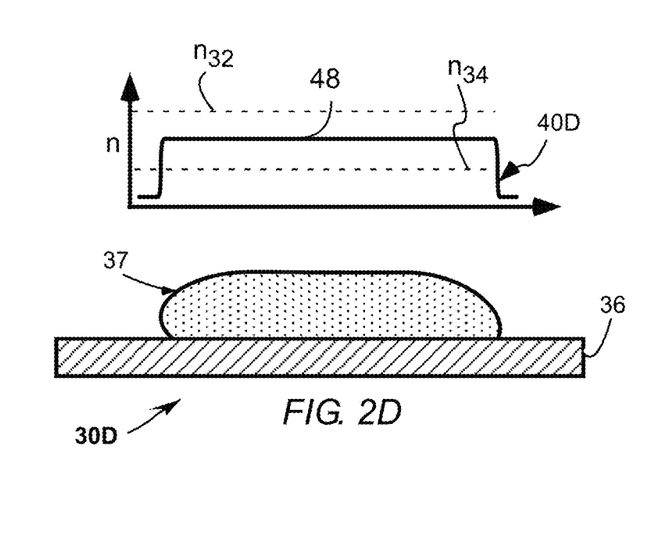
FIG. 2D is a cross-section view of that shown in FIG. 2C wherein the droplets have fully homogenized.

FIGS. 2A, 2B, 2C, and 2D are exemplary of diffusion between the diffusion permissive nanocomposite-inks and one of the plurality of nanocomposite-inks FIGS. 3A, 3B, 3C, and 3D are exemplary of diffusion between the inhibiting nanocomposite-inks and one of the plurality of nanocomposite-inks. Each figure set exemplifies diffusion, time passing between each of the figures. For comparison, the time passing between 2A, 2B to 2C and 3A, 3B, and 3C are the same respectively. FIG. 2D is exemplary of the eventual homogenization of the nanocomposite-inks.

If there is a concentration gradient between two adjacent drops, even with forces engineered to counteract the diffusive forces, over a consider timespan, both the diffusion permissive and the diffusion inhibiting nanocomposite-ink may homogenize if diffusion is not halted by curing the nanocomposite-ink. The diffusion inhibiting nanocomposite-ink will take more time to fully diffuse the diffusion permitting nanocomposite-ink. If the nanocomposite-inks are comprised of near equal concentrations of high and low index materials, diffusive forces are minimized and homogenization becomes improbable even over large time spans.

Referring to FIG. 2A, a nanocomposite-ink structure 30A has a diffusion permissive nanocomposite-ink droplet 32 and a nanocomposite-ink droplet 34 deposited adjacent to one another on a substrate 36. Permissive nanocomposite-ink 32 has an air-surface interface 34S and shares an ink-ink interface 38 with nanocomposite-ink 34. Nanocomposite-ink 32 and nanocomposite-ink 34 comprise of a nanoparticle 32 and a nanoparticle 34N, respectively, dispersed within the same organic-matrix type as organic-matrix. Permissive nanocomposite-ink 32 has a higher concentration of nanoparticles than nanocomposite-ink 34.

As initially deposited nanocomposite-structure 30A is characterized by a refractive gradient profile 40A. Refractive gradient profile 40 has a high refractive-index $n_{32}$ associated with permissive nanocomposite-ink 32. Refractive gradient profile 40 has a steep transition 42, associated with the ink-ink interface 38, to a low refractive-index $n^{34}$ associated with nanocomposite-ink 34.

Referring to FIG. 2B, a nanocomposite-ink structure 30B is similar to that shown in FIG. 2A, wherein permissive nanocomposite-ink droplet 32 and nanocomposite-ink droplets 34 have coalesced and diffusion of nanoparticles between the particles characterized by a refractive-gradient profile 40B. A short amount of time has passed since deposition resulting in the left side of the nanocomposite-ink structure maintaining high refractive-index $n_{32}$ and the right side of the nanocomposite-ink structure having the refractive-index $n_{34}$. Diffusion between the droplets results in a widened, slow refractive-index transition 44.

Referring to FIG. 2C, nanocomposite-ink structure 30C is similar to that shown in FIG. 2B, wherein more time has passed resulting in further diffusion. Nanocomposite-ink structure 30C has a coalesced structure 35 characterized by a refractive-gradient profile 40C. Diffusion of nanoparticles has occurred across the structure although the nanoparticle 32N concentration higher on the left side and concentration of nanoparticle 34N is higher on the rights side. As a result of diffusion, the left side of refractive-gradient profile 40C is slightly lower than refractive-index $n_{32}$ and the right side is slightly higher than refractive-index $n_{34}$. A refractive-index transition 46 is slower and wider than that shown in FIG. 3B Referring to FIG. 2D, a nanocomposite-ink structure 40D is similar to that shown in FIG. 2C, wherein sufficient time has passed for permissive nanocomposite-ink droplets 32 and nanocomposite-ink 34 to fully diffuse into a homogenized structure 37. Coalesced structure 37 is characterized by a refractive-gradient profile 40D. Refractive-gradient profile 40D has a substantially flat region 48 between refractive-index $n_{32}$ and $n_{34}$. The refractive-index is a result of the full diffusion of nanocomposite-ink droplets 32 and 34.

Figure 3A:
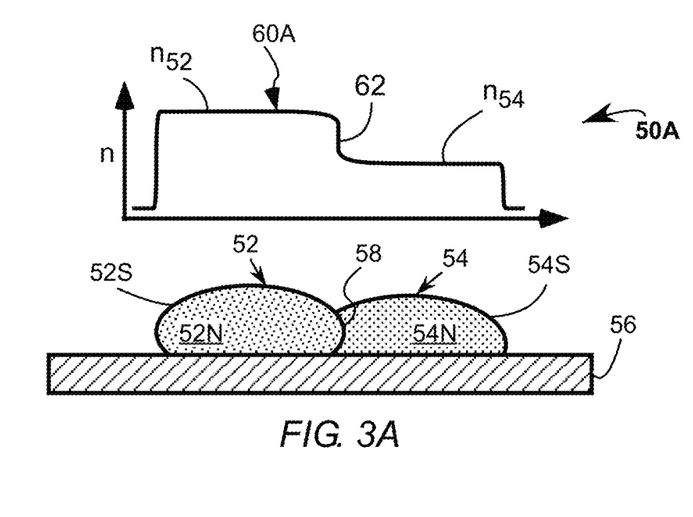
FIG. 3A is a cross-section view of the diffusion inhibiting nanocomposite-ink adjacent to another droplet of the plurality of nanocomposite-inks.

Referring to FIG. 3A, a nanocomposite-ink structure 50A has a diffusion inhibiting nanocomposite-ink droplet 52 and a nanocomposite-ink droplet 54 deposited adjacent to one another on a substrate 56. Inhibiting nanocomposite-ink 52 has an air-surface interface 54S and shares an ink-ink interface 58 with nanocomposite-ink 54. Inhibiting nanocomposite-ink 52 and nanocomposite-ink 54 comprise of a nanoparticle 52N and a nanoparticle 54N, respectively, dispersed within the same organic-matrix type. Here, permissive nanocomposite-ink 52 and nanocomposite-ink 54 have an equal nanoparticle concentration such that diffusion forces are minimized. Nanoparticle 52N has a high refractive-index and nanoparticle 54N has a low-refractive index. The refractive-index is characterized by a refractive-gradient profile 60A. Upon initial deposition the refractive profile is similar to that shown in FIG. 2A, refractive gradient profile 60A has a refractive-index $n_{52}$ on the left side associated with nanocomposite-ink 52 and refractive-index $n_{54}$ on the right side associated with nanocomposite-ink 54. A steep transition 62 from the high to the low index occurs at ink-ink interface 62.

Figure 3B:
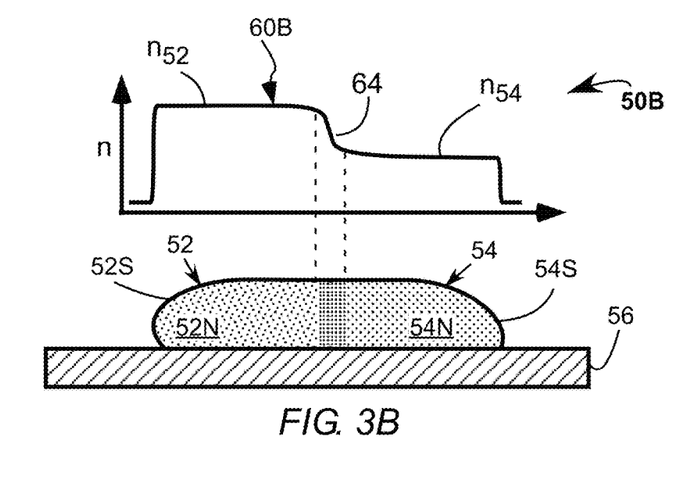
FIG. 3B is a cross-section view of that shown in FIG. 3A wherein the droplets have coalesced with minimal diffusion.

Referring to FIG. 3B, a nanocomposite structure 50B is similar to that shown in FIG. 3A wherein time has passed. The nanocomposite-inks coalesced, but limited diffusion between inhibiting nanocomposite-ink 52 and nanocomposite-ink 54 has occurred. Nanocomposite structure 50B is characterized by a refractive-gradient profile 60B. Refractive-gradient profile 60B is similar to the refractive-gradient shown in FIG. 3A. A steep transition 64 is slightly wider than steep transition 62 due to the limited diffusion of nanoparticles between the droplets.

Figure 3C:
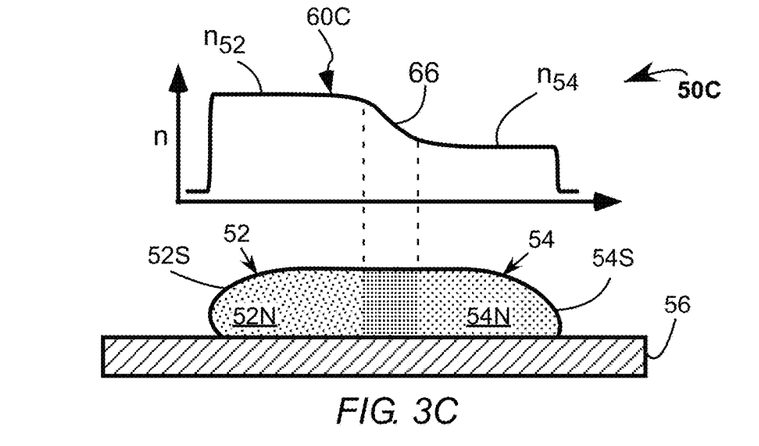
FIG. 3C is a cross-section view of that shown in FIG. 3B wherein limited diffusion has occurred.

Referring to FIG. 3C a nanocomposite structure 50C is similar to that shown in FIG. 3A wherein more time has passed resulting in further limited diffusion. Nanocomposite-ink structure 50C is characterized by a refractive-gradient profile 60C. Refractive gradient 60C maintains a refractive-index $n_{52}$ on the left side and a refractive-index $n_{54}$ on the right side with a steep transition 68 between. Transition 68 is slightly wider than that shown in FIG. 3B, yet significantly narrow compared to that shown in FIG. 2C, due to the inhibited diffusion.

Figure 4A:
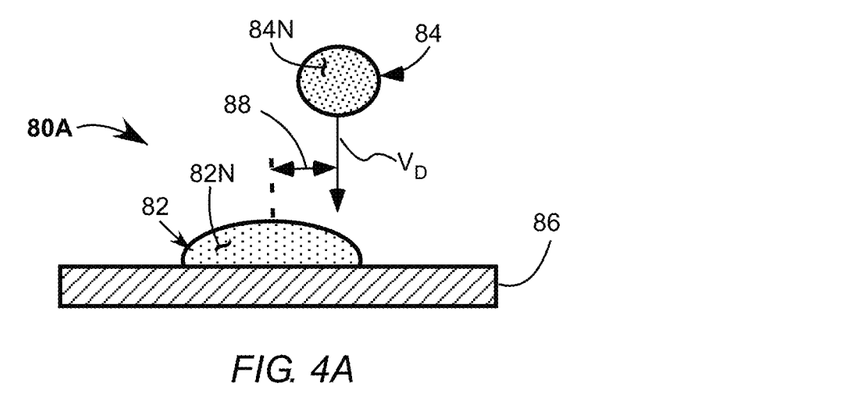
FIG. 4A is a cross-section view of a nanocomposite-ink deposition process.
Figure 4B:
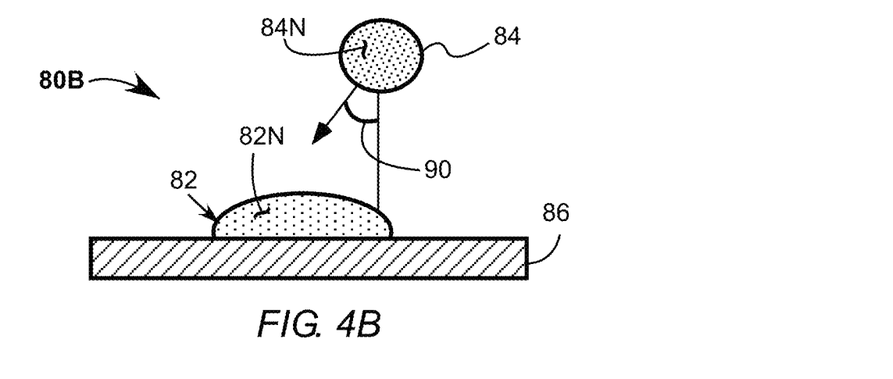
FIG. 4B is a cross-section view of a nanocomposite-ink deposition process illustrating deposition angle.
Figure 4C:
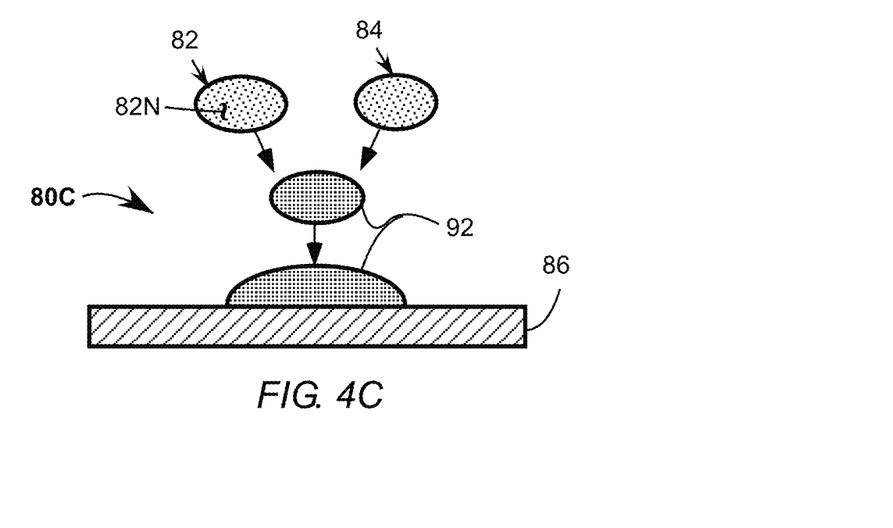
FIG. 4C is a cross-section view of a nanocomposite-ink deposition process wherein droplets are mixed in air.

As with the permissive nanocomposite-ink, the diffusion inhibiting nanocomposite-ink will eventually diffuse, although in comparison the diffusive inhibiting nanocomposite-ink over practical times scales with respect to the printing process, takes much longer to reach full diffusion. In some processes it is desirable to increase the diffusion of the diffusion inhibiting nanocomposite-ink. Diffusion can be increased by increasing the nanocomposite-ink temperature, advection mixing during deposition, using surface wetting, and actively mixing the deposited nanocomposite-ink. Similarly, diffusion can be decreased by cooling the nanocomposite-inks, partially or fully curing the nanocomposite-inks as they are deposition, or by introducing a chemical that immobilizes or otherwise blocks the physical movement of the nanofillers. FIGS. 4A, 4B, and 4C show various techniques to effectively increase diffusion of the nanocomposite-inks through advection processes.

Referring to FIG. 4A, a nanocomposite-ink deposition in-process 80A includes a nanocomposite-ink droplet 82 on a substrate 86 and a nanocomposite-ink droplet 84 in air, deposited to increase bulk flow movement between the nanocomposites-ink droplets thereby mixing the droplets through advection. Nanocomposite-ink 82 has a nanoparticle 82N dispersed within an organic matrix and nanocomposite-ink 84 has a nanoparticle 84N dispersed with the same type of organic matrix. Here nanocomposite-ink droplet 84 is deposited at an offset distance 88 at a trajectory perpendicular to the substrate at a velocity $V_D$. The offset distance can be such that the droplets are deposited directly on top of one another to maximize diffusion, or increased to partially mix at the edges. The velocity can be adjusted to change the force of impact to increase or decrease the adjective mixing.

Referring to FIG. 4B, a nanocomposite-ink deposition in-process 80B has that shown in FIG. 4A, further providing a trajectory angle 90 for deposition of nanocomposite-inks droplet 84. Changing the trajectory angle allows various degrees of contact angles on the substrate and previously deposited nanocomposite-inks. The contract angle influences the degree of wetting on the substrate, boundary conditions on the edge of droplets, and alters adjective mixing.

Referring to FIG. 4C, a nanocomposite-ink deposition in-process 80C has both nanocomposite-ink droplet 82 and nanocomposite-ink droplet 84 deposited simultaneously. Depositing the droplets simultaneously allows the droplets to strike the surface of the substrate with greater energy and increase adjective mixing. Additionally droplets can be angled or electrically charged so they combine and mix in before being depositing on the substrate. Here nanocomposite-inks droplets 82 and 84 combine into a nanocomposite-ink droplet 92 before being deposited on substrate 86. Combining the droplets in air before deposition on the substrate results in a more homogenous mixture of the nanoparticles within the droplets.

The formulation of the diffusion inhibiting nanocomposite-inks can be based on the numerous mathematical models such as Fick's law, Stokes-Einstein (SE) equation, and others, although such formulations are generally not adequate to describe nanoparticle diffusion, a phenomena that presently is not very well understood for the variety of monomers, nanoparticle size, nanoparticles shapes, surface properties, and surface chemistries. To formulate and better understand the diffusion of the inhibiting nanocomposite-ink and the diffusion permissive nanocomposite-ink empirical testing can be performed. A number of 2-dimensional and 3-dimensional print patterns can used to determine the degree of diffusion. Present literature offers a number of metrology techniques to measure gradient refractive-index optics via interferometry, confocal microscopy, optical coherence tomography, and other such techniques.

Figure 5A:
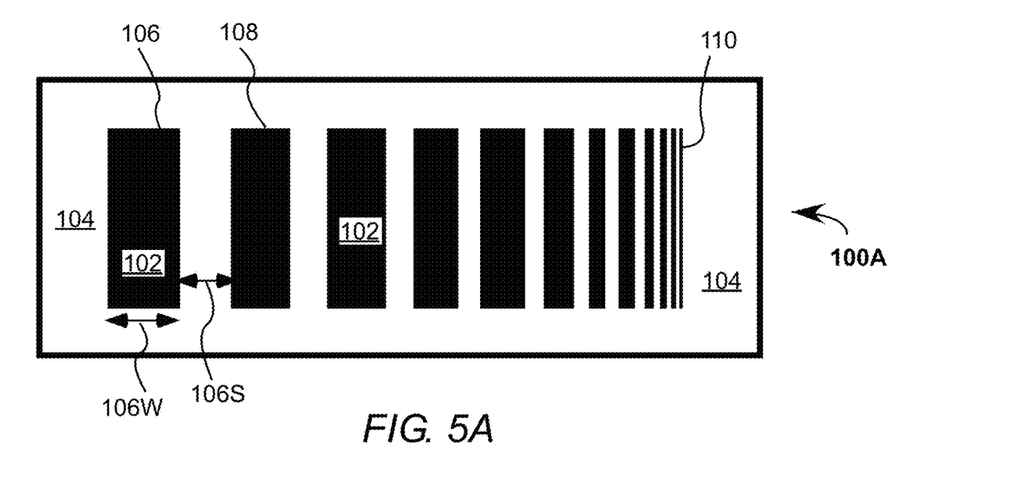
FIG. 5A is a plan-view of a 2-dimensional grating transfer function.

Referring to FIG. 5A, a 2-dimensional grating transfer function 100A has a series of alternating nanocomposite-ink bands at various widths and various spacing. Each of the dark bands are a high-index nanocomposite-ink with a low-index nanocomposite-ink 102 between. Alternatively, a pure organic-matrix, also referred to as a neat monomer, can be deposited between bands. An exemplary wide band 106 has a width 106W and has a spacing 106S from a slightly narrower band 108.

Here the transition is binary, in other grating transfer function the nanocomposite-inks can be deposited in grey scale transitions, such as sinusoid variation or saw-tooth pattern incorporating diffusion effects within the print test pattern. The curing intensity and cure schedule can be varied within the print pattern or subsequent print patterns. Here, as the band progresses from left to right the width and spacing of the bands are gradually decreased in order to diffusion effects and limitations in printing smaller high frequency gradient features. A thin band 110 is shown on the far right of the grating transfer function. Here the bands are for illustrative purposes only, in practice, band widths can be as small as the printing resolution of the printing apparatus. For instance, a 1 picoliter nanocomposite-ink droplet may only be 3-10 microns wide, depending on the drop velocity, viscosity of the nanocomposite-ink, surface tension of the nanocomposite-ink and wetting angle to the substrate.

Figure 5B:
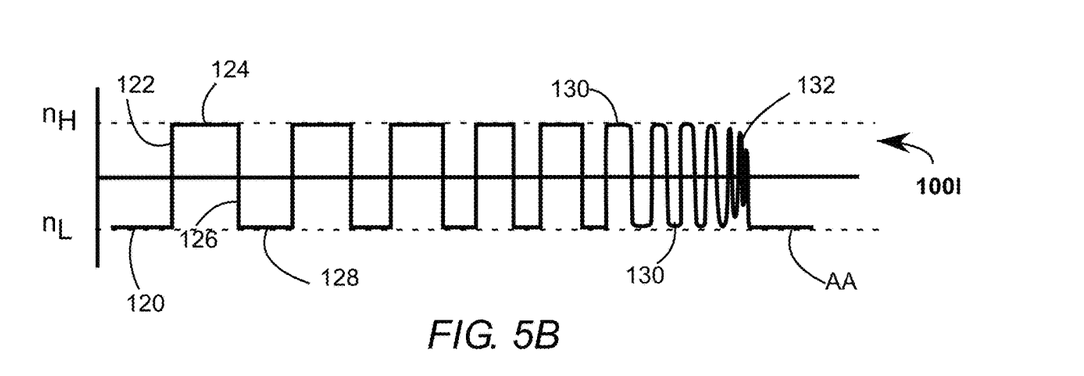
FIG. 5B is a graphical representation of the diffusion inhibiting nanocomposite-ink used in the 2-dimensional grating transfer function.

Referring to FIG. 5B, a diffusion inhibited dn/dx graph 100I shows measurement results of the grating transfer function wherein dark bands are printed with the diffusion inhibiting nanocomposite-ink with a high refractive-index $n_H$ and white areas are printed with a low-refractive-index nanocomposite-ink $n_L$. Diffusion inhibited dn/dx graph 100I has a low refractive index 120 rising to a sharp transition 122 to a high-refractive-index 124 and decreasing in a sharp transition 126 to a low refractive-index region 126. This sequence is repeated with sharp transition due to the diffusion inhibiting nanocomposite-ink limiting diffusion between the deposited nanocomposite-inks. As the width and spacing between bands reduce diffusion effects become more pronounced. At a high refractive index area 130 rounding occurs at the nanocomposite-ink transitions. At sufficiently small width and spacing, such as that shown in a thin band 132, diffusion results in intermediate values between refractive-index $n_H$ and $n_L$.

Figure 5C:
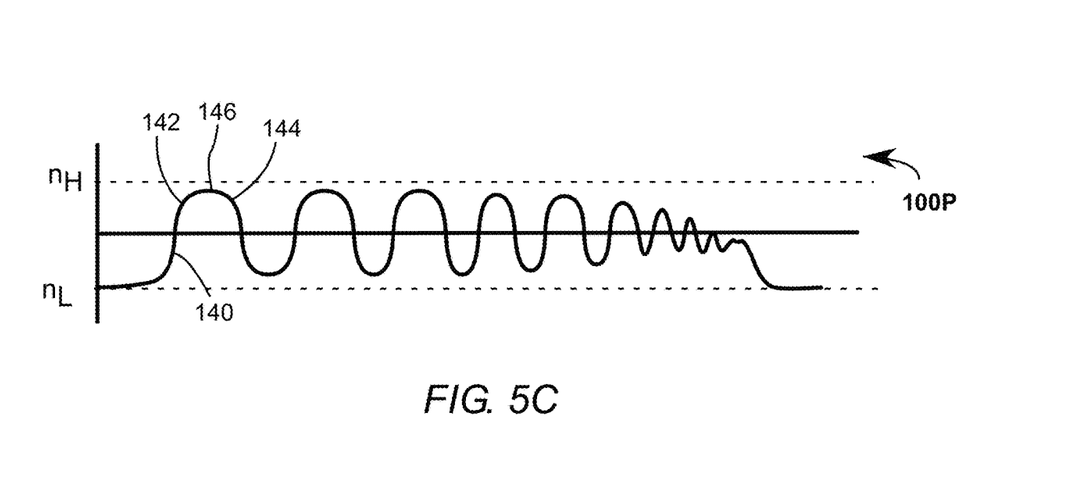
FIG. 5C is a graphical representation of the diffusion permitting nanocomposite-ink used in the 2-dimensional grating transfer function.

Referring to FIG. 5C, a diffusion permitting graph 100P shows measurement results of the grating transfer function wherein dark bands are printed with the diffusion permitting nanocomposite-ink high refractive-index $n_H$. Diffusion permitting graph starts at low refractive-index $n_L$. In contrast to that shown in FIG. 5B the transitions are more rounded, slow and the peaks of the graph are lower and higher than refractive index $n_H$ and $n_L$ respectively due to greater diffusion of nanoparticles between the nanocomposite-inks. A transition 140 slowly rises to a transition 142 rises to a peak 146, peak 146 slightly lower than high-refractive index $n_H$ then transitions back to low-refractive index. This pattern repeats with the peak values drawing closer to an average refractive-index value.

Figure 6:
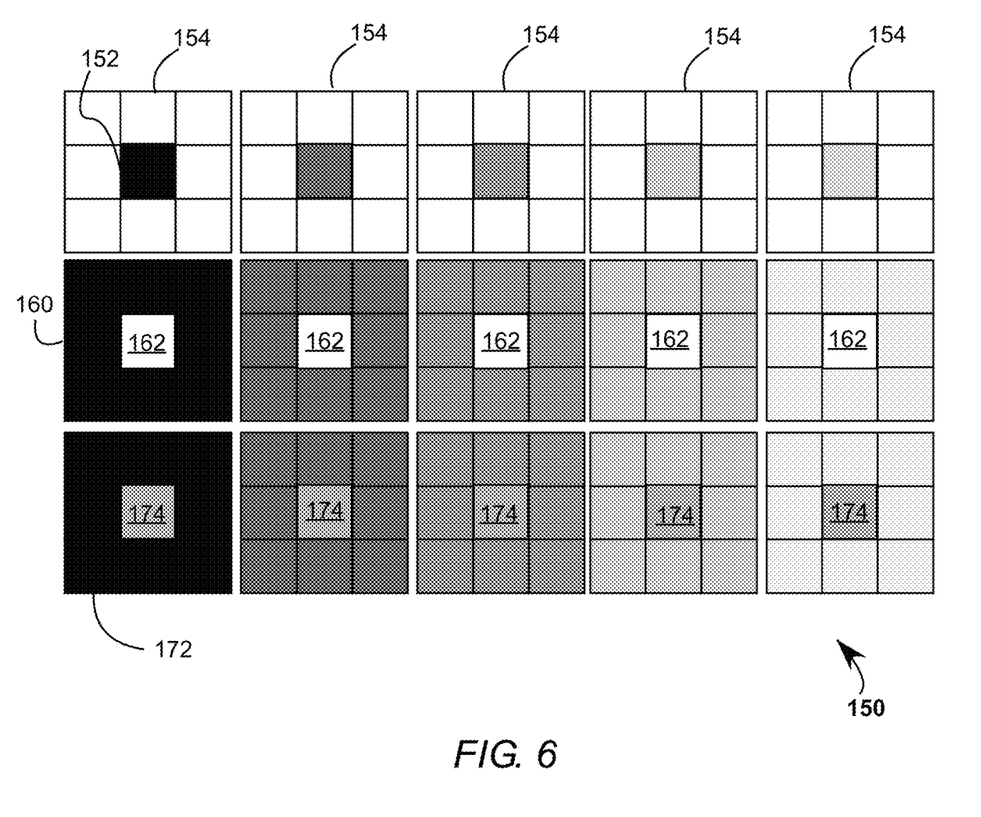
FIG. 6 is a plan view of a greyscale print test pattern.

Referring to FIG. 6, a greyscale test pattern 150 is shown. Greyscale test pattern 150 has three rows and five columns of various greyscale diffusion tests. The nanocomposite-ink is designated as white and black areas with mixtures between designated in greyscale. The first row has an inner area that transitions in nanocomposite-ink ratio for each column while the outer area remains constant. On the first row and first column a black inner area 152 is surround by a white area 154. Progressing down each column the inner area has is mixed with greater concentration of the white designated nanocomposite-ink. The second row has an outer area 160 that transitions in nanocomposite-ink ratio progressing by column and an inner area 162 that remains constant. The third row has a greyscale inner area 174 and an outer area 172 that transitions in nanocomposite-ink ratio progressing by column.

Figure 7A:
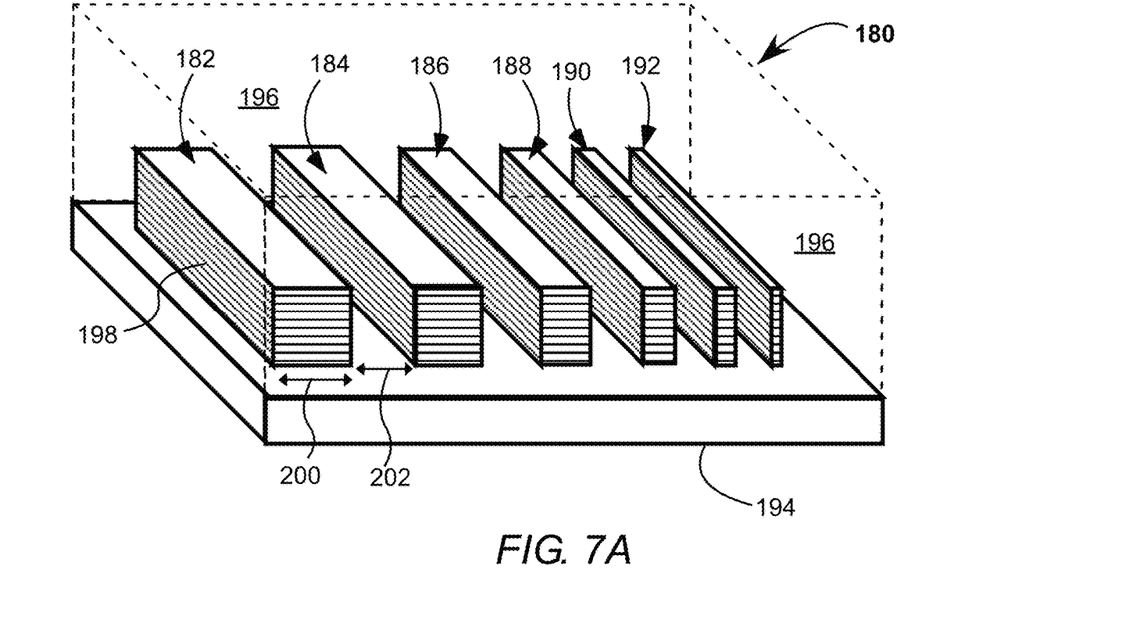
FIG. 7A is a perspective view of a 3-dimensional print test pattern.

Referring to FIG. 7A, a 3-dimension test pattern 180 has a series of 3-dimensional row nanocomposite structures 182, 184, 186, 188, 190, and 192. The row nanocomposite structures are deposited on a substrate 194. Each of the row nanocomposite structures comprise of one or more of the plurality of nanocomposite-ink with another of the nanocomposite-ink 196 deposited in other areas. The nanocomposite test pattern is deposited in layers, each of the nanocomposite-ink structures comprised of multiple layers of the plurality of nanocomposite-ink deposited consecutively. The nanocomposite-ink structure 182 has a vertical sidewall 198, a width 200, and spaced apart from nanocomposite-ink structure 184 by a separation distance 202. From left to right, the nanocomposite-ink structures decrease in spacing and width, similar to that shown in the 2-dimensional test patterns. Here, each nanocomposite row structure consists of one type of nanocomposite-ink as deposited, in other test patterns the row nanocomposite-ink structures can comprise of a plurality of nanocomposite-inks and can be printed in various concentration gradients in any of the dimensions.

Figure 7B:
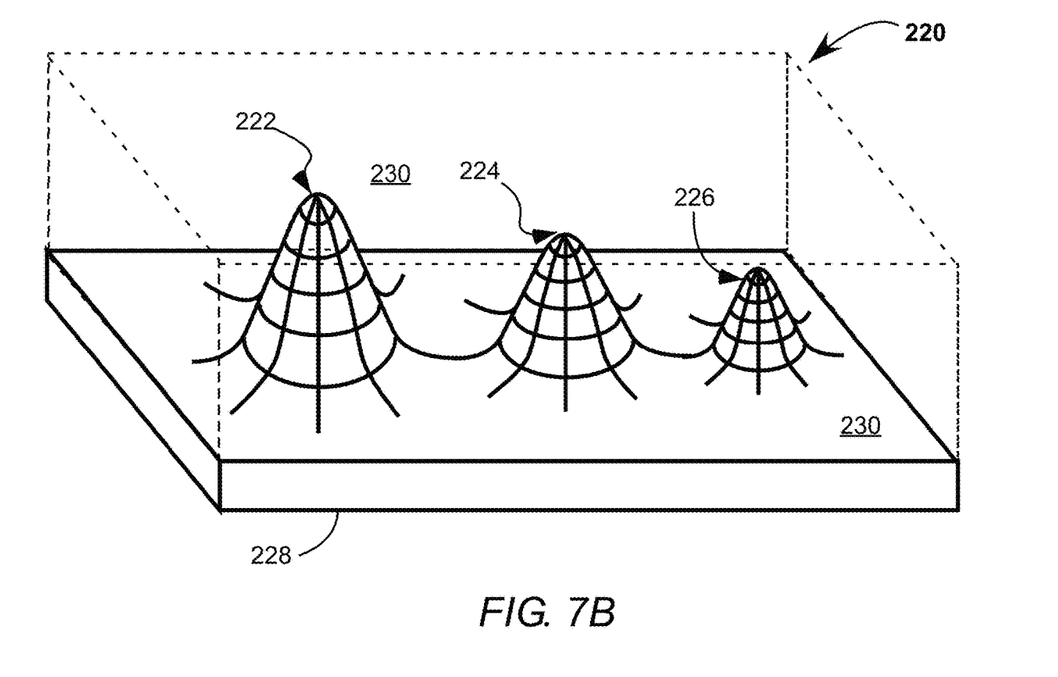
FIG. 7B is a perspective view of a 3-dimensional Gaussian print test pattern.

Measurement by aforementioned metrology techniques provide the 3-dimensional diffusion effects of the plurality of nanocomposite-ink. Similar to the 2-dimensional test patterns, the cure schedule, adjective mixing, and other diffusion related processes can implemented and varied in order to determine diffusion effects. Similarly, other 3-dimensional test patterns can be printed in order to determine diffusion effects based on various greyscale patterns and surfaces. For instance, 3-dimensional sawtooth profiles, sinusoidal contours, and other 3-dimensional patterns can be designed and diffusion effects tested Referring to FIG. 7B, another 3-dimension test pattern 220 comprises of a greyscale Gaussian nanostructure 222, 224 and 226, deposited on a substrate 228, each having a 3-dimensional Gaussian contour. Here, the Gaussian nanostructures height reduces from left to right, respectively, illustrating a vertical nanoparticle concentration gradient reduction from left to right.

In one embodiment of the present invention the plurality of nanocomposite inks comprise three nanocomposite-inks. One of the plurality of nanocomposite-inks comprises of PMMA with a 20% $ZrO_2$ nanoparticle (5 nm diameter) volumetric concentration. At the 589.3 nm d-line, PMMA has a refractive-index of 1.4905 at 589 nm and $ZrO_2$ has a refractive-index of 2.2148. The refractive-index at 589.3 nm of the 20% $ZrO^2$ is 1.6354, given by:

$$n_{eff} = 80\% \times 1.4905 + 20\% \times 2.2148 = 1.6534$$

Another of the plurality of nanocomposite-inks comprise a 10% hollow $SiO_2$ and 10% $ZrO_2$ nanoparticle volumetric concentration. At the 589.3 nm the hollow $SiO_2$ nanoparticles have a refractive-index of 1.1528. The refractive-index at 589.3 nm of PMMA with 10% $ZrO_2$ and 10% hollow $SiO_2$ is, given by:

$$n_{eff} = 80\% \times 1.4905 + 10\% \times 2.2148 + 10\% \times 1.1528 = 1.5292$$

The diffusion permissive inks are comprised of neat PMMA with a refractive index of 1.4905 at 589.36 nm. Here the organic matrix is the same between each of the plurality of nanocomposite-inks. The 20% hollow $SiO_2$ nanocomposite-ink has a concentration match to the 10% hollow $SiO_2$ and 10% $ZrO_2$ nanoparticle nanocomposite-ink thereby inhibiting diffusion with respect to another, either of the nanocomposite-ink being referred to as the diffusion inhibiting nanocomposite-ink. The 20% $ZrO_2$ nanocomposite-ink has a mismatched concentration with respect to the neat PMMA, thereby permitting diffusion.

In another embodiment of the present invention the plurality of the nanocomposite-inks comprise of only diffusion inhibiting nanocomposite-inks. For instance the PMMA with 20% $ZrO_2$ nanoparticle volumetric concentration and the PMMA with 20% hollow $SiO_2$ nanoparticle volumetric concentration. Here the nanocomposite-inks can be deposited to form a gradient refractive index profile wherein the coefficient of thermal expansion is matched throughout due to the uniform nanoparticle loading.

The present embodiments and methods described in the present disclosure invention have a variety of useful applications. For instance, the methods disclosed allows greater control of diffusion effect when manufacturing nanocomposite optical elements.

From the description of the present disclosure provided herein one skilled in the art can manufacture the apparatus and practice the methods disclosed in accordance with the present disclosure. While the present invention has been described in terms of particular embodiments and examples, others can be implemented without departing from the scope of the present invention. In summary, the present disclosure above describes particular embodiments. The invention,

What is claimed is:

1. A method of manufacturing a nanocomposite gradient-index optical element, the method comprising:
providing a plurality of nanocomposite inks comprising:
a diffusion-inhibiting nanocomposite ink formulated with equalized diffusion forces thereby retarding nanoparticle diffusion, and
a diffusion-permitting nanocomposite ink formulated with unequal diffusion forces thereby promoting nanoparticle diffusion, the diffusion-inhibiting nanocomposite ink inhibiting nanoparticle diffusion with respect to at least one other of the plurality of nanocomposite inks, the diffusion permitting nanocomposite-ink permitting nanoparticle diffusion with respect to at least one of the plurality of nanocomposite inks; and
depositing and curing a plurality of droplets of each of the plurality of nanocomposite inks to form a volumetric gradient refractive profile.

2. The method of claim 1, wherein the diffusion inhibited nanocomposite-inks have organic nanoparticle fillers.

3. The method of claim 1, wherein the diffusion inhibited nanocomposite-inks have inorganic nanoparticle fillers.

4. The method of claim 1, wherein three nanocomposite-inks are provided.

5. The method of claim 1, wherein the diffusion inhibited nanocomposite-inks include a high refractive-index nanocomposite-ink and a low refractive-index nanocomposite-ink.

6. The method of claim 5, wherein the low refractive-index nanocomposite-ink comprises of a hollow nanosphere, the hollow nanosphere composed primarily of air.

7. The method of claim 5, wherein the nanoparticle concentrations of the high refractive-index nanocomposite-ink and the low refractive-index nanocomposite-ink is matched such that diffusion between the drops before curing is minimized.

8. The method of claim 5, wherein the nanoparticle volumetric concentration of the high refractive-index nanocomposite-ink and the low refractive-index nanocomposite-ink is not matched.

9. The method of claim 5, wherein the high refractive-index nanocomposite-ink and the low refractive-index nanocomposite-ink have closely matched Abbe numbers.

10. The method of claim 1, wherein the nanoparticles diameter, shape, or combinations thereof in at least one of the plurality of nanocomposite-inks is tuned relative to the nanoparticle concentration, to minimize diffusion between the droplets before curing.

11. The method of claim 1, wherein the pH level of one of the plurality of the nanocomposite-inks is tuned relative to the nanoparticle concentration to minimize diffusion between the drops before curing.

12. The method of claim 1, wherein at least one of the plurality of nanocomposite-inks have more than one nanoparticle material type.

13. The method of claim 1, wherein the temperature of the nanocomposite-ink droplets is used to control diffusion of nanoparticles between the droplets of the plurality of nanocomposite-inks before curing.

14. The method of claim 1, wherein the temperature of a substrate is adjusted to control diffusion between the droplets of the plurality of nanocomposite-inks before curing.

15. The method of claim 1, wherein the droplet size, droplet velocity, droplet angle, and combinations thereof is adjusted to control diffusion between the droplets of the plurality of nanocomposite-inks before curing.

16. The method of claim 1 wherein the droplets are electrically charged to control nanoparticle diffusion between the droplets of the plurality of nanocomposite-inks before curing.

17. The method of claim 1, wherein the at least two of the plurality of nanocomposite-inks have closely matched optical dispersion characteristics.

18. The method of claim 1, wherein the plurality of nanocomposite-inks have the same organic-matrix type.

19. The method of claim 1, wherein the nanoparticle surfaces have a functionalized chemical coating that binds to an organic matrix or provides stearic hindrance to motion through the organic matrix.

20. The method of claim 1, wherein the nanoparticles comprise one or more metal, dielectric, semiconductor, or organic material.

21. The method of claim 1, wherein the nanoparticles are covalently bonded to an organic-matrix upon polymerization.

22. The method of claim 1, wherein nanoparticle diffusion between adjacent droplets of the plurality of nanocomposite-inks is limited by partially or fully curing the nanocomposite inks.

23. The method of claim 1, wherein the plurality of nanocomposite-inks have a composition such that the coefficient of thermal expansion is about uniform through the volumetric gradient refractive profile.

24. The method of claim 1, wherein the plurality of nanocomposite-inks are chosen such that the shrinking of droplets during curing is uniform.

25. A method of manufacturing a gradient-index optical element, the method comprising:
providing a plurality of diffusion inhibited nanocomposite-inks formulated with equalized diffusion forces thereby retarding nanoparticle diffusion, at least two of the diffusion inhibited nanocomposite inks having at least one different optical property; and
depositing and curing droplets of the diffusion inhibited nanocomposite-inks to form a volumetric gradient refractive profile.

26. The method of claim 25, wherein mixture of the diffusion inhibited nanocomposite-inks is forced by advection transport mechanisms upon deposition.

27. The method of claim 25, wherein the volumetric gradient refractive profile has a uniform nanoparticle concentration.

28. The method of claim 27, wherein the deposition of the diffusion inhibited nanocomposite-inks results in a CTE matched GRIN optical-element.

* * * * *